US012481070B2

(12) United States Patent
Wang et al.

(10) Patent No.: US 12,481,070 B2
(45) Date of Patent: Nov. 25, 2025

(54) SYSTEMS AND METHODS FOR DETERMINING INTERFERING GNSS SIGNAL SOURCE AND PROVIDING EVASIVE MANEUVER GUIDANCE FOR EVACUATING THE AFFECTED REGION

(71) Applicant: Honeywell International Inc., Charlotte, NC (US)

(72) Inventors: Guoqing Wang, Beijing (CN); Karl Abraham Keyzer, Minneapolis, MN (US); Xiaoqiang Chen, Beijing (CN); Danhua Liang, Beijing (CN); Mei Zhang, Tianjin (CN)

(73) Assignee: Honeywell International Inc., Charlotte, NC (US)

( * ) Notice: Subject to any disclaimer, the term of this patent is extended or adjusted under 35 U.S.C. 154(b) by 343 days.

(21) Appl. No.: 18/068,242

(22) Filed: Dec. 19, 2022

(65) Prior Publication Data
US 2024/0201394 A1 Jun. 20, 2024

(51) Int. Cl.
  *G01S 19/21* (2010.01)
  *G08G 5/34* (2025.01)
(52) U.S. Cl.
  CPC .............. *G01S 19/21* (2013.01); *G08G 5/34* (2025.01)
(58) Field of Classification Search
  CPC .................................. G01S 19/21; G08G 5/34
  See application file for complete search history.

(56) References Cited

U.S. PATENT DOCUMENTS

| 5,557,284 A | 9/1996 | Hartman |
| 5,952,968 A | 9/1999 | McDowell |
| 6,933,885 B1 | 8/2005 | Stockmaster et al. |
| 7,221,312 B2 | 5/2007 | Yee et al. |
| 7,250,903 B1 | 7/2007 | McDowell |
| 7,783,246 B2 | 8/2010 | Twitchell, Jr. et al. |
| 7,952,519 B1 | 5/2011 | Nielsen et al. |
| 8,830,122 B2 | 9/2014 | Menegozzi et al. |

(Continued)

FOREIGN PATENT DOCUMENTS

| CN | 104297723 A | 1/2015 |
| CN | 107567003 A | 1/2018 |

(Continued)

OTHER PUBLICATIONS

U.S. Patent and Trademark Office, "Office Action", U.S. Appl. No. 17/685,208, dated Apr. 22, 2024, pp. 1 through 47, Published: US.

(Continued)

*Primary Examiner* — Luke Huynh
(74) *Attorney, Agent, or Firm* — Fogg & Powers LLC

(57) ABSTRACT

Techniques for providing evacuation guidance parameters to a vehicle traversing in a geographical region in the presence of interfering GNSS signals are disclosed. In some embodiments, a vehicle can determine evacuation guidance parameters from characteristics of at least one interfering source and implement evasive maneuvers based on the evacuation guidance parameters. Alternatively, a vehicle can send characteristics of at least one interfering source to a central processing system located remotely from the vehicle, and receive evacuation guidance parameters from the central processing system.

20 Claims, 9 Drawing Sheets

(56) References Cited

U.S. PATENT DOCUMENTS

| | | |
|---|---|---|
| 9,185,516 B2 | 11/2015 | Fischer et al. |
| 9,466,881 B1 | 10/2016 | Berry et al. |
| 9,528,834 B2 | 12/2016 | Breed et al. |
| 9,689,686 B1 | 6/2017 | Carmack et al. |
| 9,847,033 B1 | 12/2017 | Carmack et al. |
| 9,849,978 B1 | 12/2017 | Carmack et al. |
| 10,024,973 B1 | 7/2018 | Alexander et al. |
| 10,073,179 B2 | 9/2018 | Driscoll et al. |
| 10,466,700 B1 | 11/2019 | Carmack et al. |
| 10,725,182 B2 | 7/2020 | Boyer et al. |
| 10,746,880 B2 | 8/2020 | Ben-Moshe et al. |
| 10,948,602 B1 | 3/2021 | Alexander et al. |
| 11,194,052 B1 | 12/2021 | Kazmierczak et al. |
| 11,194,053 B1 | 12/2021 | Johnston et al. |
| 11,558,106 B2 * | 1/2023 | Lekutai ................ H04L 5/1469 |
| 2004/0203461 A1 | 10/2004 | Hay |
| 2006/0023655 A1 | 2/2006 | Engel et al. |
| 2006/0234641 A1 | 10/2006 | LaGrotta |
| 2013/0310068 A1 | 11/2013 | Fischer et al. |
| 2015/0116145 A1 | 4/2015 | Ashjaee |
| 2015/0123846 A1 | 5/2015 | Jeong et al. |
| 2016/0253907 A1 | 9/2016 | Taveira |
| 2017/0070971 A1 | 3/2017 | Wietfeldt et al. |
| 2018/0068567 A1 | 3/2018 | Gong et al. |
| 2018/0165971 A1 | 6/2018 | Chen |
| 2019/0033463 A1 | 1/2019 | Ben-Moshe et al. |
| 2019/0101652 A1 | 4/2019 | Jaeckle |
| 2020/0037219 A1 * | 1/2020 | Kumar ................... B64C 19/00 |
| 2020/0225048 A1 | 7/2020 | Schwindt |
| 2020/0371246 A1 | 11/2020 | Marmet |
| 2021/0384994 A1 | 12/2021 | Borges et al. |
| 2022/0018972 A1 | 1/2022 | Bennington et al. |
| 2022/0066044 A1 | 3/2022 | McDonald et al. |
| 2022/0120914 A1 | 4/2022 | Johnson et al. |
| 2022/0171074 A1 | 6/2022 | Savoy, Jr. |
| 2023/0280472 A1 | 9/2023 | Mohan et al. |
| 2023/0382424 A1 * | 11/2023 | Hay ................ B60W 60/00188 |

FOREIGN PATENT DOCUMENTS

| | | |
|---|---|---|
| CN | 109856647 A | 6/2019 |
| CN | 113093125 A | 7/2021 |
| CN | 114034296 A | 2/2022 |
| CN | 114280648 A | 4/2022 |
| CN | 115267836 A | 11/2022 |
| EP | 3671253 A1 | 6/2020 |
| GB | 2521246 A | 6/2015 |
| GB | 2585221 A | 1/2021 |
| WO | 2013177181 A2 | 11/2013 |
| WO | 2017040076 A1 | 3/2017 |
| WO | 2020240571 A1 | 12/2020 |

OTHER PUBLICATIONS

European Patent Office, "Extended European Search Report", dated May 22, 2024, from EP Application No. 23212229.1, from Foreign Counterpart to U.S. Appl. No. 18/068,242, pp. 1 through 10, Published: EP.

European Patent Office, "Extended European Search Report" from EP Application No. 21193669.5, from Foreign Counterpart to U.S. Appl. No. 17/445,524, May 30, 2022, pp. 1 through 14, Published: EP.

European Patent Office, "Partial European Search Report from EP Application No. 21193669.5", from Foreign Counterpart to U.S. Appl. No. 17/445,524, Feb. 23, 2022, pp. 1 through 15, Published: EP.

Grace et al., "An Automated Tool for Mission Planning in GPS-Denied Areas", Toyon Research Corporation, report work sponsored by the U.S. Navy, Space and Naval Warfare Systems Center, San Diego, CA, 2006, pp. 1 through 6.

Psiaki et al., "GNSS Spoofing Detection Using Two-Antenna Differential Carrier Phase", Institute of Navigation (ION), Proceedings of the 27th International Technical Meeting of the Satellite Division of The Institute of Navigation (ION GNSS+ 2014), Sep. 8-14, 2014, Tampa, FL, pp. 2776-2800.

Mohan, et al., "Systems and Methods to Provide Real-Time Context-Based Avoidance Mechanisms for GNSS Jamming or Spoofing Regions", U.S. Appl. No. 17/685,208, filed Mar. 2, 2022, pp. 1 through 30.

Airbus, "GNSS loss and GNSS Interferences on Airbus A/C", In-Service Information, Feb. 22, 2019, pp. 1 through 15, (c) Airbus SAS, 2019.

BBC, "Study maps 'extensive Russian GPS spoofing'", Apr. 2, 2019, pp. 1 through 7, https://www.bbc.com/news/technology-47786248.

European Patent Office, "Extended European Search Report from EP Application No. 21190914.8" from Foreign Counterpart to U.S. Appl. No. 17/177,437, May 24, 2022, pp. 1 through 9, Published: EP.

European Patent Office, "Extended European Search Report", from EP Application No. 23156338.8, from Foreign Counterpart to U.S. Appl. No. 17/685,208, Jul. 5, 2023, pp. 1 through 8, Published: EP.

Harris, "FAA Files Reveal a Surprising Threat to Airline Safety: The U.S. Military's GPS Tests", IEEE Spectrum, pp. 1 through 24, as downloaded on Sep. 2, 2021 from: https://spectrum.ieee.org/faa-files-reveal-a-surprising-threat-to-airline-safety-the-us-military-gps-tests.

Kong, Peng-Yong, "A Survey of Cyberattack Countermeasures for Unmanned Aerial Vehicles", IEEE Access, IEEE, USA, vol. 9, Nov. 2, 2021, XP011887453, pp. 148244 through 148263.

McDonald et al., "Systems and Methods for Collecting, Processing and Providing Geographic Information About Interference With a Global Navigation Satellite System", U.S. Appl. No. 17/177,437, filed Feb. 17, 2021, pp. 1 through 29, Published: US.

The Editorial Team, "Understanding GPS spoofing in shipping: How to stay protected", Connectivity, Cyber Security, Jan. 31, 2020, as downloaded on Sep. 2, 2021 from https://safety4sea.com/cm-undertanding-gps-spoofing-in-shipping-how-to-stay-protected/?_cf_chl_jschl_tk_=pmd_01LryD_KGvK4u2F18xAFwse8 . . . , pp. 1 through 10.

Tranchet, "ED-259—Jamming detection", Presented in One Hundred and Seventh Meeting, Special Committee 159 (SC-159), Navigation Equipment Using the Global Navigation Satellite System (GNSS) and Fifty-Second Meeting EUROCAE Working Group 62 (WG-62), Galileo, May 13, 2020, pp. 1 through 7, Airbus.

U.S. Patent and Trademark Office, "Final Office Action", U.S. Appl. No. 17/177,437, Feb. 16, 2023, pp. 1 through 22, Published: US.

U.S. Patent and Trademark Office, "Office Action", U.S. Appl. No. 17/177,437, Sep. 19, 2022, pp. 1 through 36, Published: US.

U.S. Patent and Trademark Office, "Restriction Requirement", U.S. Appl. No. 17/685,208, dated Mar. 1, 2024, pp. 1 through 7, Published: US.

U.S. Patent and Trademark Office, "Notice of Allowance", U.S. Appl. No. 17/685,208, dated Sep. 28, 2024, pp. 1 through 8, Published: US.

European Patent Office, "Communication pursuant to Article 94(3)EPC", dated Feb. 12, 2025, from EP Application No. 23156338.8, from Foreign Counterpart to U.S. Appl. No. 17/685,208, pp. 1 through 7, Published: EP.

* cited by examiner

SYSTEMS AND METHODS FOR DETERMINING INTERFERING GNSS SIGNAL SOURCE AND PROVIDING EVASIVE MANEUVER GUIDANCE FOR EVACUATING THE AFFECTED REGION

BACKGROUND

Satellite navigation systems (SNS) allow electronic receivers to determine a location within a few meters using time signals transmitted along a radio line of sight from satellites of a satellite constellation or satellite constellations. The signals also allow the receivers to calculate the current local time to high precision, which enables time synchronization from the time signals received from each of the satellites. A satellite navigation system with global coverage is referred to as a global navigation satellite system, or GNSS.

GNSS plays an increasingly important role in vehicles as a navigation data source. In the context of aircraft, functions such as area navigation (RNAV), required navigation performance (RNP), required navigation performance authorization required (RNP AR), localizer performance (LP), approaches with vertical guidance (APV), localizer performance with vertical guidance/satellite-based landing system (LPV/SLS), ground-based augmentation system (GLS) provide inputs to a variety of flight systems, including a flight management system (FMS), terrain avoidance and warning system (TAWS), airborne collision avoidance system (ACAS), automatic dependent surveillance-broadcast (ADS-B), and others.

One of the challenges to GNSS is the threat of unwanted signals which may cause the loss of GNSS navigation functions and/or produce misleading navigation information in a geographic region proximate to the generating source. Jamming (or radio interference) causes the loss of GNSS satellite signals, while spoofing causes the GNSS receiver to determine false kinematic states. That is, unwanted GNSS signals are signals that interfere with normal operation of a GNSS receiver, for example, by intentionally or unintentionally misrepresenting the true position of the vehicle that normally would be determined but for the presence of interfering signals. Common forms of interfering GNSS signals come from spoofing or jamming.

Some systems, for example satellite-based augmentation systems (SBAS) and ground-based augmentation systems (GBAS) are designed to improve GNSS accuracy and/or integrity. However, these systems only improve GNSS performance over their entire coverage, and do not address localized effects from jamming and spoofing over multiple geographical locations. Even a vehicle that can detect GNSS interference may still be unable to determine how to evacuate the geographical region after it unknowably enters such a region.

SUMMARY

In one embodiment, a method is disclosed. The method comprises receiving at least one characteristic of at least one source radiating signals in at least one geographical region in which a vehicle is traversing. The at least one characteristic is received in response to a determination that the radiating signals from the at least one source interfere with operation of at least one global navigation satellite systems (GNSS) receiver associated with the vehicle. The method further comprises sending, in response to the received at least one characteristic of the at least one source, a message to one or more systems on the vehicle. The message includes evacuation guidance parameters that provide a representation of interference mitigation due to the interference of the at least one GNSS receiver from the at least one source during a period of time in which the vehicle is inside the at least one geographical region.

In another embodiment, a program product comprising a non-transitory processor-readable medium on which program instructions, configured to be executed by at least one processor, are embodied. When executed by the at least one processor, the program instructions cause the at least one processor to receive at least one characteristic of at least one source radiating signals in at least one geographical region in which a vehicle is traversing in. The at least one characteristic is received in response to a determination that the radiating signals from the at least one source interfere with operation of at least one global navigation satellite systems (GNSS) receiver associated with the vehicle. The program instructions further cause the at least one processor to send, in response to the received at least one characteristic of the at least one source, a message to one or more systems on the vehicle. The message includes evacuation guidance parameters that provide a representation of interference mitigation due to the interference of the at least one GNSS receiver from the at least one source during a period of time in which the vehicle is inside the at least one geographical region.

In yet another embodiment, a system comprises at least one global navigation satellite system (GNSS) receiver mounted on a vehicle and configured to receive GNSS signals. The system further comprises a vehicle processing system coupled to the vehicle and comprising at least one processor coupled to the at least one GNSS receiver. The vehicle processing system is configured to determine interfering GNSS signals from the GNSS signals. The at least one processor is configured to determine, from the interfering GNSS signals, at least one characteristic of at least one source radiating signals in at least one geographical region in which the vehicle is traversing. The at least one processor is further configured to acquire, in response to the determined at least one characteristic of the at least one source, evacuation guidance parameters that provide a representation of interference mitigation due to the interference of the at least one GNSS receiver from the at least one source during a period of time in which the vehicle is inside the at least one geographical region.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, as briefly described below and as described further in the following detailed description.

Figure 1:
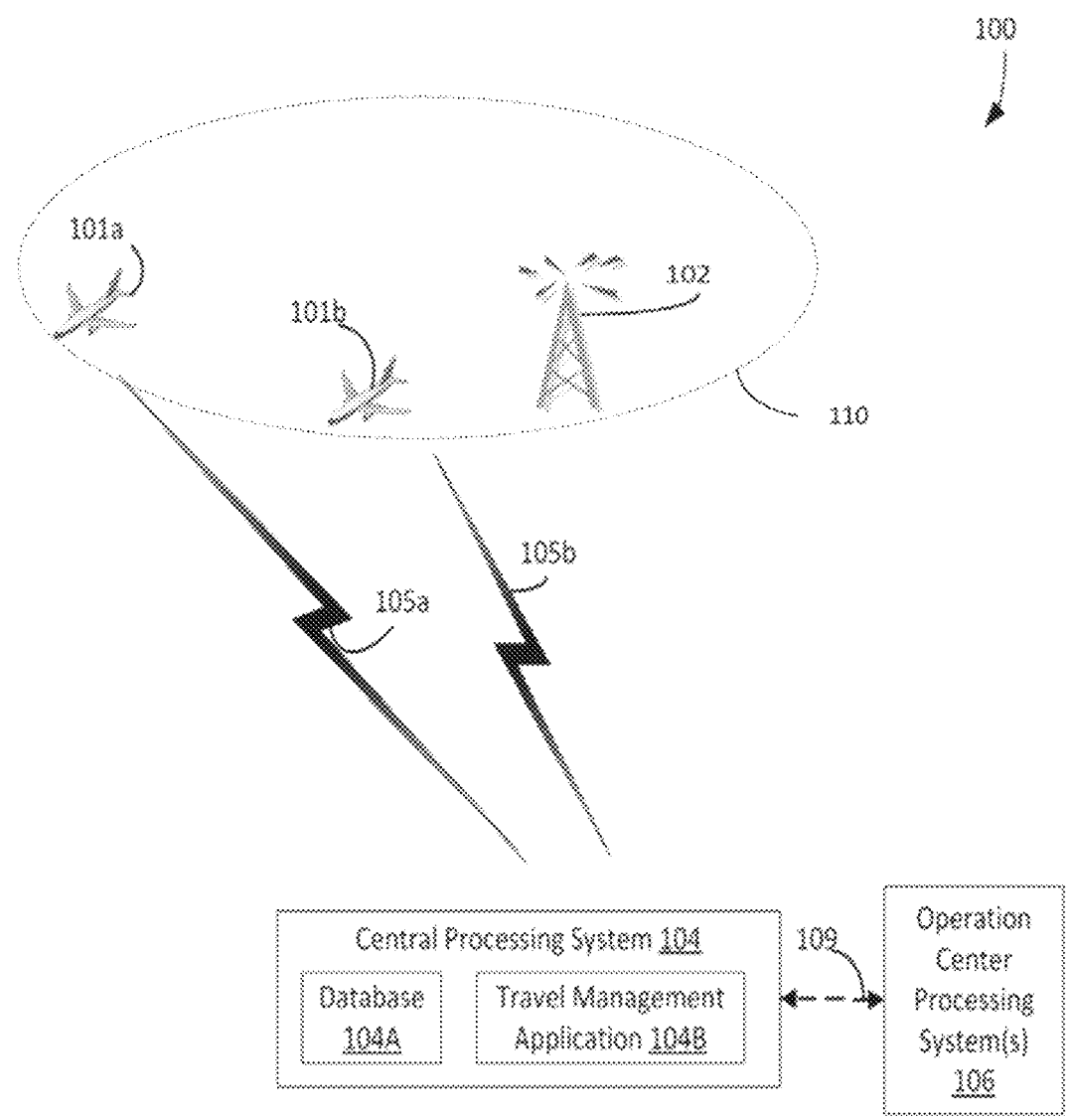
FIG. 1 depicts a diagram illustrating an exemplary central processing system configured to communicate GNSS jamming or spoofing information to vehicles in a communication network.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments implementing techniques to detect, avoid, and mitigate interfering GNSS signals for vehicles are disclosed. In contrast to conventional GNSS avoidance techniques based on a priori knowledge of GNSS disturbance regions, the embodiments presented herein provide adaptive and real-time avoidance of interfering GNSS signals without knowing beforehand whether the vehicle is traversing in a geographic location with interfering GNSS signals. And, in contrast to conventional GNSS mitigation techniques limited to information acquired by the navigation systems of the affected vehicle, embodiments presented herein enable a vehicle to actively modify its flight plan using dynamic information from sources outside of the vehicle systems, even when the vehicle is already in a region affected by GNSS jamming or spoofing. That is, the present disclosure provides techniques for adaptive GNSS disturbance detection, avoidance, and mitigation for vehicles already affected by interfering GNSS signals in a geographical location (although any techniques disclosed may also be used proactively outside of spoofing or jamming locations). Even when a vehicle lacks the capability to determine evacuation guidance parameters from its own systems, it can utilize the benefits of real-time evacuation and mitigation guidance originating from outside the vehicle.

FIG. 1 depicts a diagram illustrating an exemplary central processing system 104 configured to communicate GNSS jamming or spoofing information to vehicles in a communication network 100. The central processing system 104 includes a database 104A and a travel management application 104B. The database 104A and/or the travel management application 104B can be stored in memory circuitry. Central processing system 104 may include processing circuitry comprising any one or combination of processors, microprocessors, digital signal processors, application specific integrated circuits, field programmable gate arrays, and/or other similar variants thereof. Central processing system 104 may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures.

Use of the term "vehicle" is not intended to be limiting and includes all classes of vehicles falling within the ordinary meaning of the term. This would include but not limited to, aerial traversing vehicles (e.g., commercial, non-commercial, or recreational aircraft), unmanned and/or space traversing vehicles (e.g., satellites, urban air mobility vehicles), water traversing vehicles (e.g., ships, submarines), and land traversing vehicles (e.g., automobiles including cars, trucks, motorcycles). Throughout the disclosure, the vehicle may be further illustrated as an aircraft with the understanding that the principles described herein apply to other vehicles where applicable.

Still referring to FIG. 1, central processing system 104 is configured to communicate with one or more vehicles in the communication network 100, including vehicles 101a and 101b, over a respective communication link 105a, 105b. Communication links 105a, 105b can be any form of wireless communication, including but not limiting to, high frequency (HF), very high frequency (VHF), satellite communications (SATCOM), datalink, and the like.

Vehicles 101a, 101b are configured to communicate data to central processing system 104 including characteristics of the unwanted signals that are interfering with operation of at least one GNSS receiver on the vehicles 101a, 101b in a geographical region 110. The characteristics of the unwanted signals can include an azimuth parameter of a GNSS interference source(s) 102, such as mismatched azimuth measurements to expected azimuth, the type of GNSS interference (jamming or spoofing), pseudo-random noise (PRN) number, and timing information. In some embodiments, the vehicles 101a, 101b also provide data of the vehicle position (e.g., altitude), or other signal characteristics data including pseudorange and/or pseudorange rate measurements, carrier phase measurements, doppler count measurements, and/or signal strength of the interfering signals. As used herein, a geographical region means a region that includes one or more GNSS interference sources 102 radiating interfering signals that affect the operation of a GNSS receiver onboard a vehicle. A geographical region 110 can be defined by the interference range caused by the GNSS interference sources 102 that would be detectable from the perspective of sensors onboard the vehicle.

For example, when vehicles 101a and/or 101b enter a geographic region associated with GNSS interference, such as from a GNSS interference source 102 transmitting interfering signals in the geographical region 110, the vehicles gather data characterizing the interfering GNSS signals and send the data to central processing system 104. Vehicles 101a and/or 101b can also be equipped with GNSS spoofing and/or jamming detection systems (e.g., using conventional GNSS spoofing and/or jamming detection techniques, or in some embodiments techniques as described in FIGS. 2-3) to determine when GNSS data for each vehicle 101a, 101b is being spoofed or jammed. Vehicles 101a, 101b may continue to send data about at least one geographic region associated with GNSS interference until the respective vehicle exits the interfering geographic region (e.g., it no longer detects interfering signals that impact the operation of their respective GNSS receivers).

Central processing system 104 is also configured to receive GNSS signal characteristics data associated with interfering signals simultaneously or from any vehicles in communication network 100 experiencing unwanted GNSS signal interference associated with the geographic region 110. In some embodiments, central processing system 104 is configured to store the acquired GNSS spoofing and/or jamming data in database 104A, including one or more zones in a geographical region where GNSS interference is currently present. In some embodiments, database 104A is configured to store known characteristics data acquired a priori for future use for another vehicle traversing through geographic region 110 that is impacted by unwanted GNSS signals. Database 104A can also be periodically updated as more recent data becomes available. After central processing system 104 receives characteristics data of the interfering signals in the geographical region, it determines evacuation guidance parameters for the impacted vehicles based on the received data and optionally, the known GNSS interference data stored in database 104A. As used herein, evacuation guidance parameters are parameters that provide a representation of GNSS interference mitigation and/or evacuation guidance for exiting the geographical region currently being traversed by a vehicle. A vehicle experiencing GNSS interference in the geographical region 110 can use the evacuation guidance parameters to avoid or mitigate GNSS interference while traversing in the geographical region. In one embodiment, vehicles 101a and/or 101b sends a request to central processing system 104 for evacuation guidance parameters, in which case central processing system 104 is configured to provide evacuation guidance parameters to the requesting vehicle in response to the request. A vehicle 101a, 101b can send a request to central processing system 104 even though the vehicle 101a, 101b is within the geographical location associated with unwanted GNSS signals and is currently being impacted by interfering signals caused by GNSS interference source 102.

Central processing system 104 is configured to send the evacuation guidance parameters to vehicles 101a, 101b. When the vehicles 101a, 101b receive the evacuation guidance parameters, they can execute evasive maneuvers for exiting the geographical region 110. For example, the vehicles 101a, 101b may change the current travel path based on the evacuation guidance parameters. In some embodiments, vehicle 101a, 101b sends a message to an operation center processing system 106 (e.g., an air traffic control center) with the modified travel path for approval. Optionally, central processing system 104 is communicatively coupled to operation center processing system 106 via a communication link 109. In these embodiments, central processing system 104 sends updated data about at least one geographic region 110 to operation center processing system 106. Additionally, or alternatively, central processing system 104 is configured to send the evacuation guidance parameters for a vehicle 101a, 101b to operation center processing system 106. This enables operation center processing system 106 to be aware of the GNSS interference in the geographical region 110 and the intended evacuation response from the vehicle 101a, 101b.

Some vehicles 101a, 101b, may not be configured to determine the origin of the GNSS interference source(s) 102 when the vehicle is traversing within geographical region 110. Even when a vehicle 101a, 101b, can detect spoofing or jamming in geographical region 110, it may not be able to determine the location of the entity (or entities) responsible for causing the interfering GNSS signals. Therefore, central processing system 104 is configured to determine the location of the GNSS interference source 102 based on the location of the geographical region 110 in which the vehicle is traversing in, and data provided by the vehicle 101a, 101b, and other vehicles in the communication network 100. Central processing system 104 can use the data provided by the vehicle 101a, 101b, and any data provided from other vehicles stored in database 104A, to determine the location of GNSS interference source 102 and to send the location determination to the vehicle. In some embodiments, central processing system 104 extrapolates the position, altitude, or other navigation parameter of the GNSS interference source 102, by primary surveillance radar (PSR), secondary surveillance radar (SSR), multilateration, crowded-sourced traffic surveillance, or other non-GNSS dependent methods.

Additionally, or alternatively, central processing system 104 is configured to determine movement (e.g., a change in position) of the GNSS interference source(s) 102. For example, after central processing system 104 determines the location of a GNSS interference source 102, it can also determine characteristics such as velocity, acceleration, variations of velocity or acceleration, jerk, and other movement information about the GNSS interference source 102 based on data such as the position of the GNSS interference source 102 for different periods of time, doppler count measurements, groundspeed of the vehicle 101a, 101b, and other information stored in database 104A.

Additionally, or alternatively, central processing system 104 is configured to extrapolate the geographical region 110 as the vehicle 101a, 101b, traverses through the region, e.g., by mapping out terrain features, the path of the vehicle 101a, 101b through the geographical region 110, and other information to the vehicle. In one embodiment, central processing system 104 gathers data from vehicle 101a, 101b or provided from other vehicles in the communication network 100 on the topology of the geographical region 110 (e.g., freeway topology or landmark distributions). The geographical region 110 can then be mapped out on a three-dimensional map, optionally annotated with characteristics of terrain features in the geographic region 110, and provided to the vehicle 101a, 101b. Additionally, the terrain topology data can be used to identify the location, movement, and/or identity of the GNSS interference source 102.

Using the gathered data described above, central processing system 104 sends evacuation guidance parameters to the vehicle 101a, 101b. In some embodiments, central processing system 104 optionally determines a recommended travel path that minimizes travel in the geographical region 110, or one that avoids proximity to the GNSS interference source(s) 102 present in the geographical region 110 to the vehicle 101a, 101b. In other embodiments, central processing system 104 sends alert messages to the vehicle 101a, 101b that parameterize the GNSS interference sources 102 to the vehicle (e.g., including the source azimuth and/or movement of the GNSS interference 102) so the vehicle can modify its own travel path accordingly.

Figure 2:
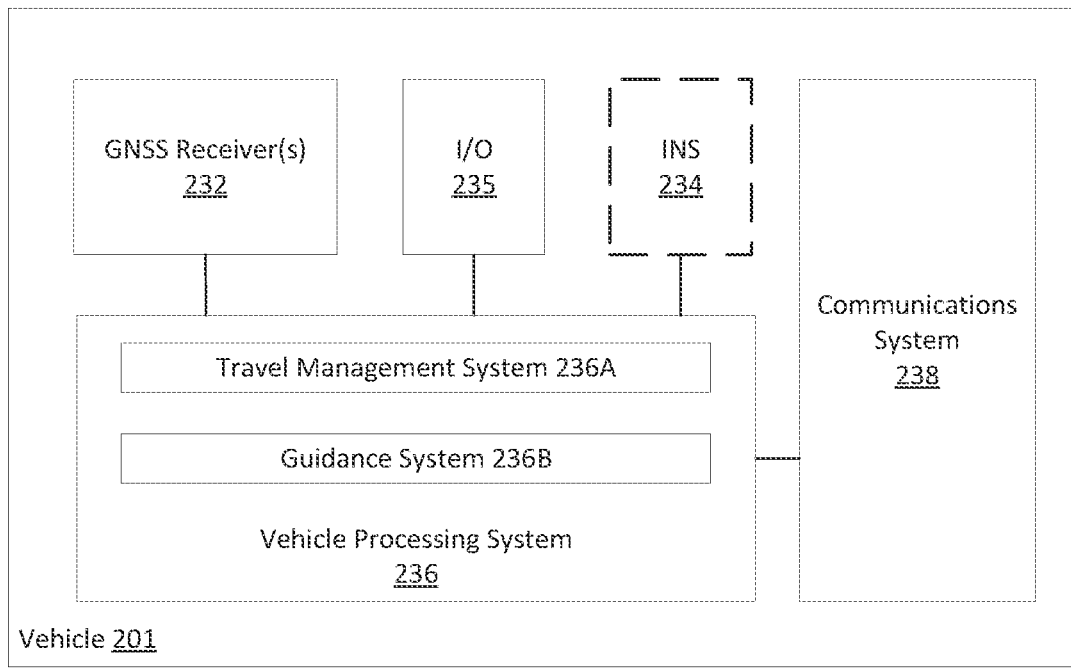
FIG. 2 depicts a block diagram illustrating an exemplary system implemented on a vehicle configured to implement evasive maneuvers in response to a determination of GNSS interference in a geographical region.

FIG. 2 depicts a block diagram illustrating an exemplary system implemented on a vehicle 201 configured to implement evasive maneuvers in response to a determination of GNSS interference in a geographical region with one or more GNSS interference sources. The system includes a vehicle processing system 236 and a communications system 238 on a vehicle 201. Vehicle processing system 236 is coupled to one or more GNSS receivers 232, input/output (I/O) 235, and optional inertial navigation system (INS) 234, and configured to receive data from each subsystem. GNSS receiver 232 is configured to receive GNSS signals from a plurality of satellites in a GNSS constellation. GNSS receiver 232 (e.g., through a processing device) is also configured to determine a three-dimensional position from the GNSS signals, for example, based on pseudo-range or satellite ephemeris data. Some example GNSS systems include the Global Positioning System (GPS), Galileo, Beidou, and Globalnaya Navigazionnaya Sputnikovaya Sistema (GLONASS).

I/O 235 includes one or more input and output ports configured to couple vehicle processing system 236 to other systems and circuitry on vehicle 201, including display(s) such as touch screen display(s), keyboard(s), and switch(es). In some embodiments, I/O 235 transmits data from the vehicle crew to vehicle processing system 236 and provides data from vehicle processing system 236 to the vehicle crew. Based on the evacuation guidance parameters determined by the vehicle 201 or from central processing system 104, and/or the signal characteristic data determined from the GNSS interference source 102, the vehicle processing system 236 is configured to adjust the operational modes of one or more navigation systems, such as INS 234 or TAWS (Terrain Alert and Warning System), which are not explicitly shown in FIG. 2 but coupled to the vehicle processing system 236 through I/O 235.

INS 234 is configured to determine one or more navigation parameters for the vehicle 201 based on received navigation measurements from one or more sensors on the vehicle. In some embodiments, vehicle 201 is configured to determine a vehicle position from INS 234 or an alternative positioning system when vehicle 201 receives interfering signals from GNSS receiver 232. INS 234 includes one or more gyroscopes, one or more accelerometers, and/or one or more magnetometers. In some embodiments, INS 234 is implemented with one or more inertial measurement units (IMU). INS 234 is optional because some vehicles 201 may not have independent (that is, non-GNSS) position determining systems and may need to rely on external guidance from central processing system 104 if vehicle 201 experiences interference from unwanted GNSS signals.

Vehicle processing system 236 also includes a travel management system (e.g., a flight management system) 236A configured to determine at least one modified travel path for vehicle 201 based on the evacuation guidance parameters. Vehicle processing system 236 is configured to send the at least one modified travel path to the vehicle operator and/or crew members via I/O 235, and to receive a selection of a one of the travel paths from the vehicle operator and/or crew members. Vehicle processing system 236 is then configured to send the selected travel path to communications system 238 (e.g., a communications management unit (CMU)) so that the travel path can be sent to an operation center processing system for review or approval.

Vehicle processing system 236 also includes a guidance system 236B configured for implementing evacuation guidance parameters. In some embodiments, guidance system 236B uses data gathered from systems on the vehicle 201 to determine evasive maneuvers based on the evacuation guidance parameters and/or characteristics of one or more GNSS interference sources in the geographical region encompassed by the vehicle 201, as previously described in FIG. 1. In these embodiments, vehicle processing system 236 is configured to determine that vehicle 201 is located in a geographical region that includes at least one GNSS interference source and/or that the vehicle 201 (e.g., via the GNSS receiver 232) is receiving unwanted GNSS signals from a GNSS interference source. Upon determining that at least one of these conditions is true, vehicle 201 is configured to gather at least one characteristic of the unwanted GNSS signals and/or at least one characteristic of the GNSS interference source (if it can be determined) that is radiating the interfering GNSS signals. For example, vehicle processing system 236 may determine azimuth ambiguity measurements of the GNSS interference source(s) and any movement associated with the source azimuth, the type of unwanted GNSS signal (spoofing or jamming signal), PRN number, timing information, and other characteristics, as described in FIG. 1, based on data gathered from systems onboard the vehicle and the GNSS-acquired data from GNSS receiver 232. In some embodiments, vehicle processing system 236 is configured to determine evacuation guidance parameters, including azimuth parameters of the GNSS interference source (e.g., at least one azimuth ambiguity, and/or a deterministic source azimuth) from the gathered characteristic data. In other embodiments, vehicle processing system 236 receives evacuation guidance parameters from communications system 238 sent from central processing system 104 (FIG. 1).

In some embodiments, vehicle processing system 236 provides the characteristics data to guidance system 236B. Guidance system 236B is configured to determine and execute evasive maneuvers from the source azimuth of each GNSS interference source in the geographical region, the movement associated with each GNSS interference source in the geographical region, and other evacuation guidance parameters. For example, guidance system 236B may determine that the GNSS interference sources in the geographical region pose a substantial threat to the safe navigation of the vehicle 201 or the safety of the aircraft personnel, and in response, may then implement emergency protocols to evacuate the geographical region. Vehicle processing system 236 can send alert messages based on guidance from guidance system 236B, to systems onboard the vehicle characterizing the threat based on the evacuation guidance parameters, as well as to ground stations (e.g., central processing system 104) via communications system 238. Guidance system 236B can inhibit or disable vehicle systems that are dependent on GNSS-acquired data from GNSS receiver 232, including disabling the GNSS receiver 232 itself. Additionally, or alternatively, guidance system 236B is configured to select operational modes of navigation systems of the vehicle so that these systems can operate in selected modes without or with acceptable levels of GNSS interference while traversing in the geographical region. Vehicle processing system 236 then sends control signals to the navigation systems to operate only in the selected modes determined by guidance system 236B. Other system operations can be modified. For example, a TAWS can be modified to revert back to a basic GPWS mode for avoiding nuisance alerts, a TCAS can be modified by disabling passive and/or hybrid surveillance functionalities, and GNSS operations can be disabled in systems performing critical flight functions to prevent hazardous or catastrophic failures, e.g., RNP AR, LPV, and the like.

In some embodiments, travel management system 236A is configured to modify the current travel path of the vehicle 201 based on the received evacuation guidance parameters (e.g., the source azimuth of each GNSS interference source and the movement of each GNSS interference source in a geographical region). For example, travel management system 236A may include a navigation display that displays the determined source azimuth or azimuth ambiguities of a GNSS interference source. Additionally, the projected or measured movement of the GNSS interference source over time can be indicated on the display. The navigation display may display other features, including nearby locations of interest in the geographical region or terrain features such as roads, mountains, buildings, other vehicles, and the like. Once a modified travel plan has been generated, it can be displayed on the navigation display, and can be further modified as other GNSS interference sources are detected and/or the movement associated with any GNSS interference source changes.

For example, in one embodiment travel management system 236A is configured to determine a first modified travel path based on the azimuth ambiguities of at least one GNSS interference source in the geographical region. As the characteristics data of the interfering signals are processed and additional evacuation guidance parameters such as the source azimuth of the at least one GNSS interference source become known, travel management system 236A can then modify the first modified travel path and generate a second modified travel path based on the source azimuth of the at least one GNSS interference source. If one or more of the GNSS interference sources are moving in the geographical region, then travel management system 236A can generate a third modified travel path based on the movement of the GNSS interference sources. In this way, travel management system 236A can continue to modify the travel path of the vehicle 201 in the geographical region in real-time as new or updated evacuation guidance parameters are determined so that the vehicle 201 can exit the geographical region quickly and return to its original travel path.

Figure 3:
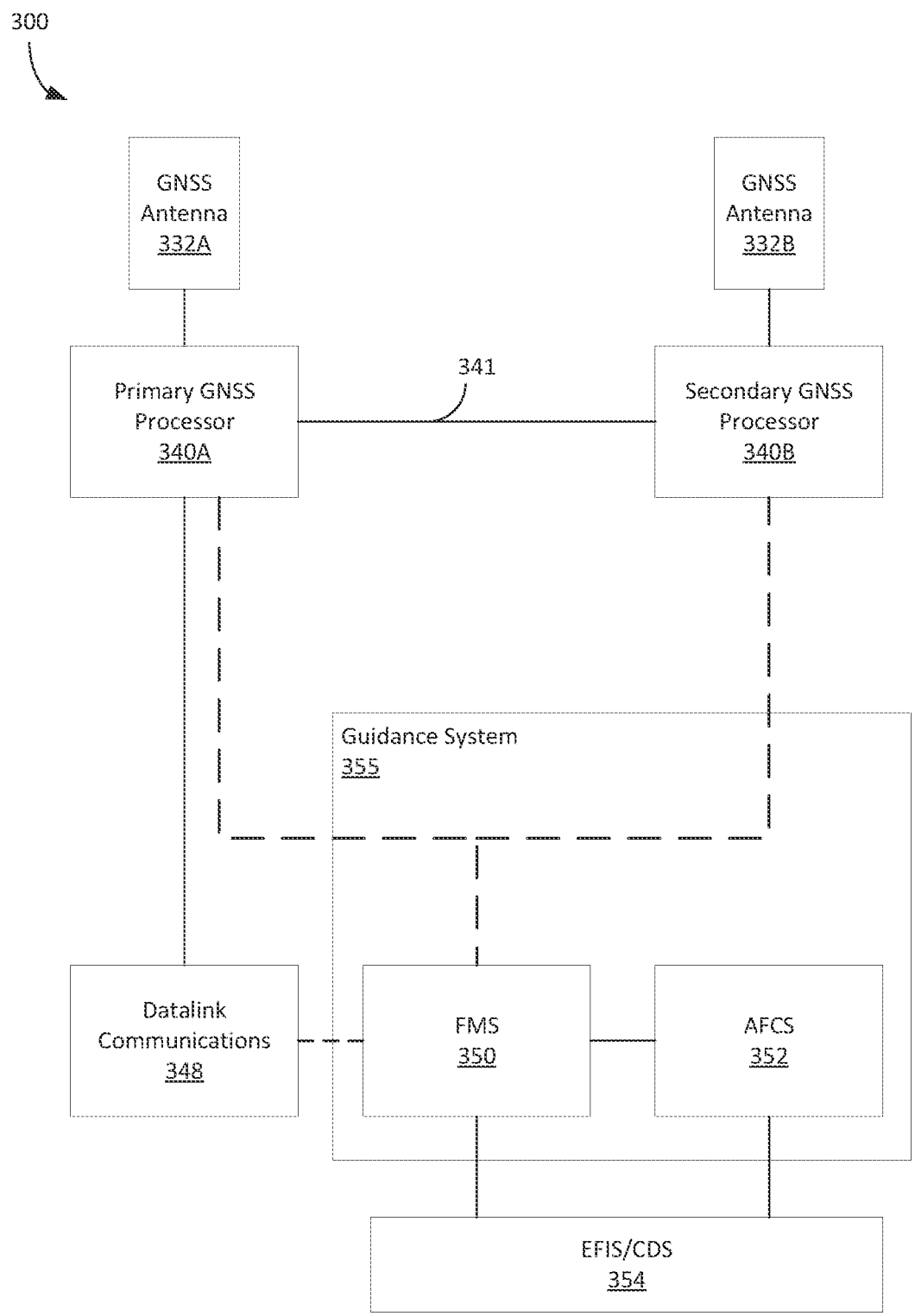
FIG. 3 depicts an exemplary system configured to determine and implement evacuation guidance parameters based on characteristic data corresponding to at least one GNSS interference source in a geographical region.

FIG. 3 depicts an exemplary system 300 configured to determine and implement evacuation guidance parameters based on characteristic data acquired from at least one GNSS interference source and/or from unwanted GNSS signals. System 300 is implemented on a vehicle, such as vehicle 201 previously described in connection with FIG. 2.

In system 300, a first GNSS antenna 332A is coupled to a primary GNSS processor 340A and a second GNSS antenna 332B is coupled to a secondary GNSS processor 340B. Both primary GNSS processor 340A and secondary GNSS processor 340B can be implemented as line replaceable units (LRU) on the vehicle, and in some embodiments represent an integrated GNSS receiving and processing system. Primary GNSS processor 340A is configured to determine characteristics of signals acquired from GNSS antenna 332A: likewise, secondary GNSS processor 340B determines characteristics of signals acquired from GNSS antenna 332B. In some embodiments, primary GNSS processor 340A and secondary GNSS processor 340B are implemented in a master-slave configuration, with primary GNSS processor 340A acting as the master processing system and secondary GNSS processor 340B acting as the slave processing system, or vice versa. A crosstalk bus 341 is connected to both GNSS processors 340A, 340B, which is configured to communicate signal characteristic data between primary GNSS processor 340A and secondary GNSS processor 340B so that at least one of the primary GNSS processor 340A or secondary GNSS processor 340B, as the master processing system, can compare differences in characteristics data. For example, primary GNSS processor 340A may receive independent sensor data, e.g., the GNSS signal carrier phase, measurement or sampling time, pseudo-range measurements, from both GNSS receiver modules, for detecting GNSS interference sources and determining evasive maneuvers. Alternatively, primary GNSS processor 340A, secondary GNSS processor 340B are independent systems each configured to perform GNSS receiving functions for GNSS signal detection and navigational data solution. In some examples, signal characteristics data are provided to one or more inertial reference units (IRU), and GNSS interference source detection and evasive maneuver generation are performed by an inertial reference system (IRS). That is, the determination and/or processing of the signal characteristics data from GNSS antennas 332A, 332B, and any other processing described for vehicle processing system 236 can be performed by one or more IRS.

In an embodiment, the characteristics data from the solution(s) of primary GNSS processor 340A and secondary GNSS processor 340B are provided to datalink communications system 348 and flight management system (FMS) 350. Datalink communications system 348 can comprise a communications management unit (CMU) or implemented as a communications management function (CMF) by at least one processor. Datalink communications system 348 is configured to send one or more datalink messages to external entities from the vehicle, such as a ground station and/or central processing system 104. For example, datalink communications system 348 can send a downlink message with the determined characteristics and request that the central processing system 104 provide evacuation guidance parameters for navigating out of a geographical region that the vehicle is currently within and experiencing GNSS interference. If the vehicle is configured to determine evacuation guidance parameters out of its own accord, e.g., via guidance system 236B, then datalink communications system 348 is configured to send a downlink message to one or more ground systems that alerts the ground systems to the geographical region in which the vehicle is experiencing GNSS interference. In one example, datalink communications system 348 operates identically to communications system 238.

Guidance system 355 is coupled to datalink communications system 348 and optionally to primary GNSS processor 340A and secondary GNSS processor 340B. When the vehicle is not able to determine evacuation guidance parameters while in the geographical region, guidance system 355 receives the evacuation guidance parameters from datalink communications system 348 that were sent by the central processing system 104. Alternatively, guidance system 355 receives the characteristics data from primary GNSS processor 340A and/or secondary GNSS processor 340B and determines the evacuation guidance parameters from the characteristics data. Guidance system 355 is configured to execute evasive maneuvers (e.g., AFCS 352) via based on the received or determined evacuation guidance parameters. In an embodiment, guidance system 355 operates identically to guidance system 236B of FIG. 2.

In some embodiments, guidance system 355 comprises a Flight management system (FMS) 350. FMS 350 receives the evacuation guidance parameters from datalink communications system 348 and/or primary GNSS processor 340A and secondary GNSS processor 340B. FMS 350 is configured to determine evasive maneuvers to navigate through the geographical region based on the evacuation guidance parameters. In one example, the vehicle can generate a modified flight plan that mitigates the amount of time spent, or travel within, the geographical region and can send the modified flight plan to the ground station(s) via datalink communications system 348. For an aerial vehicle, FMS 350 operates identically to travel management system 236A. For example, FMS 350 analyzes the azimuth parameters and/or movement of each GNSS interference source and determines a modified flight path based on the azimuth and/or movement, along with other flight constraints of the vehicle. The flight crew may interact with FMS 350 and manually implement the modified flight path through an electronic flight instrument system (EFIS)/cockpit display system (CDS) 354, or may enable the modified flight path to be implemented automatically by autopilot functionality (e.g., via an automated flight control system (AFCS) 352).

Figure 4:
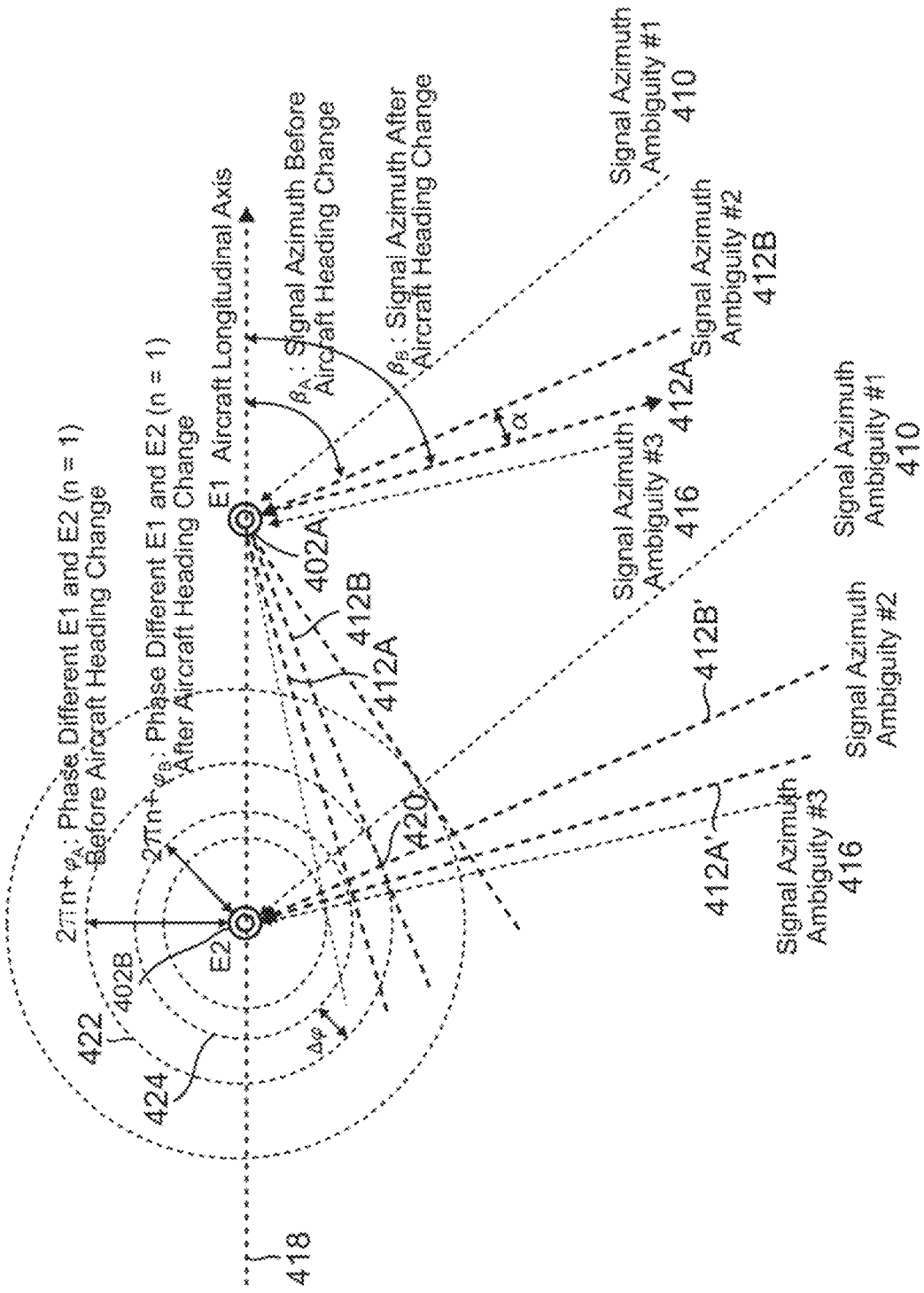
FIG. 4 depicts a diagram of an exemplary method for determining the location of a GNSS interference source using a plurality of antenna elements.

FIG. 4 depicts a diagram of an exemplary method for determining the source azimuth of a GNSS interference source using a plurality of antenna elements 402A (also referred to as "E1" in FIG. 4), and 402B (also referred to as "E2" in FIG. 4) mounted on a vehicle. Although FIG. 4 illustrates two distinct antenna elements 402A, 402B, any number of antenna elements can be used. Antenna elements 402A, 402B can be mounted on different portions of the vehicle and in some embodiments are part of different sensor systems on the vehicle (e.g., antenna element 402A corresponds to primary GNSS processor 340A while antenna element 402B corresponds to secondary GNSS processor 340B). In this example, the two antenna elements are mounted parallel to the aircraft longitudinal axis, and the baseline distance between antenna elements exceeds one carrier wavelength.

In general, an antenna receiving a radio frequency (RF) signal in a region of GNSS interference will not be able to accurately determine the location of the interference source. Instead, the azimuth of the GNSS interference source will be ambiguous from the perspective of the antenna receiver, resulting in many possible azimuth ambiguities of where the source signal originated from. For example, as illustrated in FIG. 4, the GNSS interference source signal may originate from any of the azimuth ambiguity paths 410, 412B, or 416.

Based on the differences in carrier phase between the antenna elements 402A, 402B, the true source azimuth 412B (among one of the source azimuth ambiguities) of the GNSS interference source can be determined from the possible azimuth ambiguities. Because each antenna element 402A, 402B is positioned differently about the vehicle, the interfering GNSS signal will approach each respective antenna element 402A, 402B at slightly different times and at different carrier phases. That is, antenna element 402A may receive the signal of the GNSS interference source at a first carrier phase while antenna element 402B may receive the azimuth ambiguity of the same GNSS interference source at a second carrier phase. The carrier phase difference of the signals received at the antenna elements 402A, 402B is then based on the difference between the first carrier phase and the second carrier phase. For purposes of pedagogical explanation, FIG. 4 visualizes the carrier phase difference between antenna element 402A and antenna element 402B by rotating the azimuth ambiguity 412B 90 degrees and projecting the azimuth ambiguity 412B with respect to the longitudinal axis 418 of the aircraft. The angle 2 $\pi n + \varphi_A$ (represented as circle 422) with respect to the antenna element 402B given by the point 420 at which the azimuth ambiguity 412B intersects the azimuth ambiguity 412B' is the carrier phase difference between the azimuth ambiguity 412B received at antenna element 402A and the corresponding azimuth ambiguity 412B' received at antenna element 402B. The phase difference directly measured by the antennas is A. For a particular azimuth ambiguity, e.g., azimuth ambiguity 412B, n=1. The carrier phase difference for each remaining azimuth ambiguity 410, 416, (which correspond to n=2 and n=0) respectively), can be obtained similarly as described for azimuth ambiguity 412B (which corresponds to the true source azimuth).

Although the ambiguity in the source azimuth from the GNSS interference source can be reduced in combination of carrier phase difference and pseudorange measurements, pseudorange rate measurements, carrier phase measurements, and/or doppler count measurements, in some embodiments, a more precise determination of the source azimuth is obtained by observing the carrier phase difference shift in conjunction with aircraft heading changes. The carrier phase difference $\varphi_A$ as observed from the antenna elements 402A, 402B may change as the heading of the aircraft changes, if the aircraft changes direction during flight. For example, referring to FIG. 4, the azimuth ambiguity 412B may be shifted by an angle $\alpha$ as the aircraft changes heading so that at the new heading the azimuth ambiguity changes from the ambiguity shown by line 412B to line 412A. When this happens, the angle of the signal azimuth $\beta$ will also shift accordingly. As illustrated in FIG. 4, the angle $\beta_A$ between the longitudinal axis 418 of the aircraft and the azimuth ambiguity 412B is the azimuth ambiguity angle before the heading of the aircraft changes, while the angle $\beta_B$ between the longitudinal axis 418 of the aircraft and the azimuth ambiguity 412A is the signal azimuth angle after the heading of the aircraft changes. This is expressed mathematically by the equation $\beta_B = \beta_A + \alpha$. Likewise, the azimuth ambiguity 412B' as received at antenna element 402B will also shift to azimuth ambiguity 412A' as the heading of the aircraft changes. The measured carrier phase difference $\varphi_B$ from the azimuth ambiguity 412A, 412A' after the heading of the aircraft changes can be determined as previously described, resulting in a quantity 2 $\pi n + \varphi_B$ visually depicted in FIG. 4 as circle 424. The carrier phase difference shift caused by the heading changes of the aircraft $\Delta \varphi$ then corresponds to the expected phase difference shift consistent with the true source azimuth of the GNSS interference source.

For other azimuth ambiguities 410, 416 that do not represent the true source azimuth of the GNSS interference source, the respective shifted carrier phase difference (not explicitly shown in FIG. 4) caused by the heading change of the aircraft will not in general match the aircraft heading angle $\alpha$. The heading-shifted carrier phase differences for each azimuth ambiguity will instead deviate from the expected carrier phase difference shift $\Delta \varphi$ for each given azimuth ambiguity. For example, in one embodiment the expected carrier phase difference shift is calculated by the equation:

$$\Delta \varphi = (2\pi n + \varphi_A)\left(1 - \frac{\sin\left(\frac{\pi}{2} - \beta_A - \alpha\right)}{\sin\left(\frac{\pi}{2} - \beta_A\right)}\right)$$

where n is the ambiguity number, $_A$ is the carrier phase difference between the antenna elements 402A, 402B before the aircraft heading change, $\beta_A$ is the source azimuth angle for a respective azimuth ambiguity before the aircraft heading change, and a is the angle of the aircraft heading change. In general, n, $\beta_A$, $\alpha$, and $\varphi_A$ is known or can be derived for each respective azimuth ambiguity. The expected carrier phase difference shift $\Delta \varphi$ and the measured carrier phase difference shift for each azimuth ambiguity can be compared to determine the true source azimuth. If the expected and measured carrier phase difference shift values after the aircraft changes heading are sufficiently different (e.g., the difference between the expected and measured carrier phase difference shift exceeds a given threshold), that azimuth ambiguity can be excluded as the true source azimuth ambiguity of the GNSS interference source.

Figure 5:
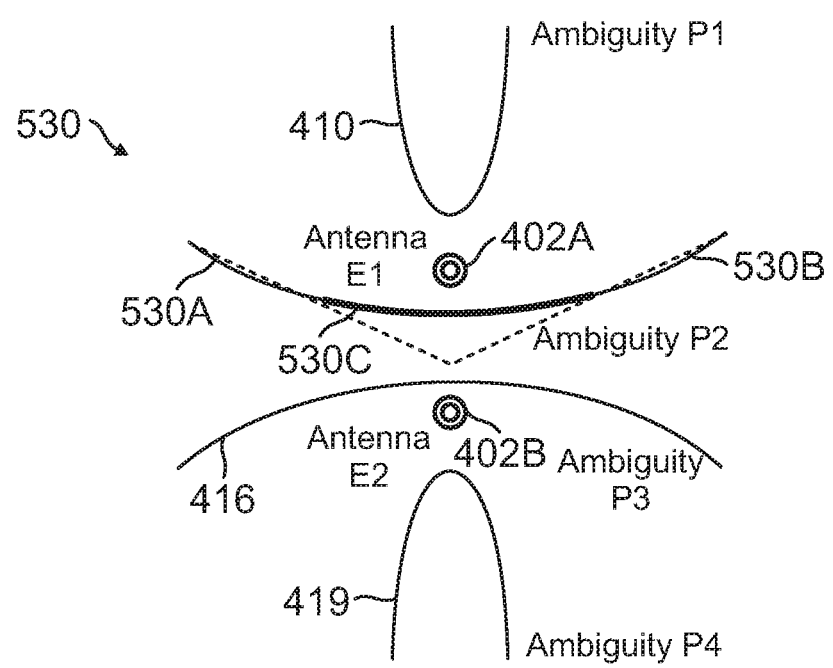
FIG. 5 depicts a diagram of isolating the source azimuth of a GNSS interference source.

In some embodiments, the true source azimuth ambiguity can be further processed to remove yet further ambiguities in the location of the GNSS interference source, as illustrated in FIG. 5. FIG. 5 depicts a diagram of isolating the source azimuth of a GNSS interference source. Initially, four different azimuth ambiguities 410, 530, 416, 419, (represented as curved lines) are associated with the same GNSS interference source. Azimuth ambiguities 410, 416, and 419 have been subsequently excluded as the true source azimuth of the GNSS interference source, e.g., based on the analysis of carrier phase measurements described in the context of FIG. 4. Although azimuth ambiguity 530 has been determined to include the source azimuth of the GNSS interference source, the source azimuth may be located at any point along the curve of the azimuth ambiguity 530, and therefore the specific source azimuth may not be known.

To exclude one or more portions of the azimuth ambiguity 530 and further isolate the source azimuth of the GNSS interference source, a processing mask can be applied to the azimuth ambiguity 530. In some embodiments, the processing mask can be set with parameters based on the structure of the vehicle and the location of the antenna elements 402A, 402B. For example, if the antenna elements are mounted along the longitudinal axis of an aircraft, the fuselage of the aircraft along the longitudinal axis can be used to further isolate the source azimuth from the azimuth ambiguity 530, since the fuselage would inhibit any signal reception to the antenna elements 402A, 402B along the longitudinal axis and therefore it would be unlikely that the signal azimuth would originate in that direction. This is shown in FIG. 5, in which a processing mask based on the structure is applied to azimuth ambiguity 530 to exclude portion 530C that corresponds to the longitudinal axis of the vehicle. Accordingly, the source azimuth of the GNSS interference source has been further isolated from azimuth ambiguity 530 generally, to either portion 530A or portion 530B.

Figure 6B:
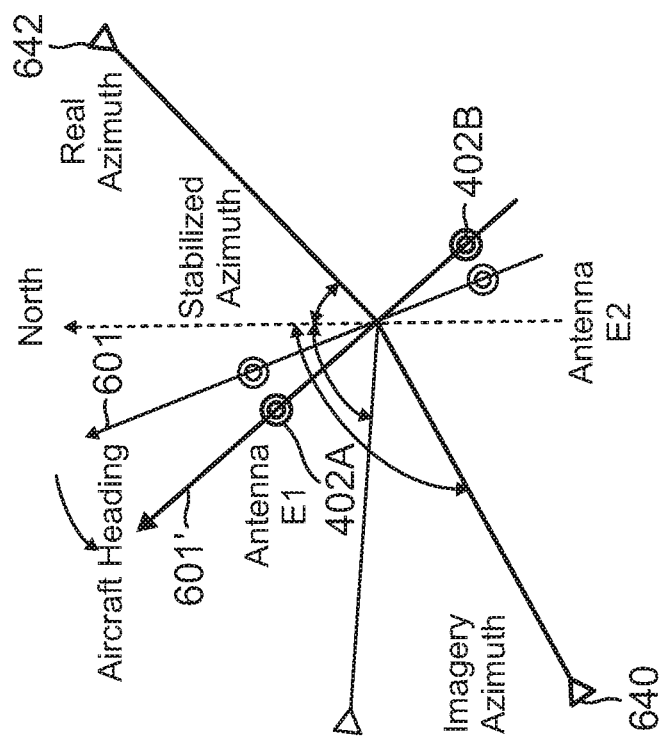
FIG. 6B depicts a diagram of identifying a true source azimuth from the two possible source azimuths based on aircraft heading changes.
Figure 6A:
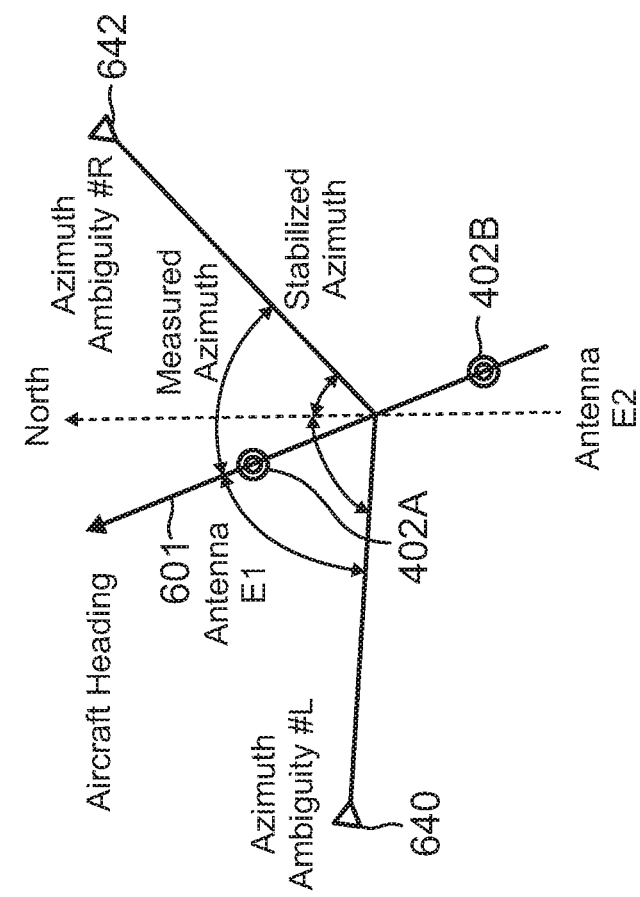
FIG. 6A depicts a diagram of two possible source azimuths along a signal azimuth ambiguity curve.

In some embodiments, the azimuth ambiguity can be further processed to isolate the source azimuth of the GNSS interference source, as depicted in FIGS. 6A-6B. FIG. 6A depicts a diagram of two possible source azimuths along an azimuth ambiguity curve. In contrast, FIG. 6B depicts a diagram of identifying a true source azimuth from the two possible source azimuths based on aircraft heading changes.

Referring to FIG. 6A, the aircraft heading is represented on a first curve 601 relative to a reference point, such as the axis of true North. The antenna elements 402A, 402B are oriented on the first curve 601, and are configured to determine a measured azimuth to a first azimuth ambiguity 640 and a second azimuth ambiguity 642. Additionally, the antenna elements 402A, 402B are configured to determine a first reference azimuth to the first azimuth ambiguity 640 and a second reference azimuth to the second azimuth ambiguity 642 relative to the true North axis. That is, the first reference azimuth corresponds to the angle between the first azimuth ambiguity 640 and the true North axis and the second reference azimuth corresponds to the angle between the second azimuth ambiguity 642 and the true North axis.

In general, the positions of the first azimuth ambiguity 640 and second azimuth ambiguity 642 should remain approximately fixed relative to the true North axis, even when the aircraft experiences a change in heading and position movement considering the large distance between the aircraft and the GNSS interference source as well as the sampling interval of the processing. Conversely, an azimuth ambiguity that substantially changes as the aircraft heading changes suggests that the azimuth ambiguity is not the true source azimuth of the GNSS interference source, but rather, is an image azimuth observed by the antenna elements 402A, 402B. Now referring to FIG. 6B, which illustrates a shifted first curve 601' from the original orientation as shown by the curve 601 (the same as curve 601 from FIG. 6A) due to a change in heading of the aircraft. Therefore, the positions of the antenna elements 402A, 402B also change relative to the true North axis.

As shown in FIG. 6B, the first azimuth ambiguity 640 changes in position relative to the true North axis as the aircraft experiences a change in heading. Since a GNSS interference source should in principle remain consistent with its position relative to true North before and after the aircraft heading change, first azimuth ambiguity 640 corresponds to an image source that is not the source azimuth of the GNSS interference source. However, second ambiguity 642 remains relatively consistent in position from the true North axis as the aircraft experiences a heading change between FIGS. 6A-6B. Accordingly, second ambiguity 642 corresponds to the source azimuth of the GNSS interference source. First azimuth ambiguity 640 can then be excluded as a potential source ambiguity and second azimuth ambiguity 642 can be used for further GNSS interference mitigation and evacuation guidance.

Figure 7:
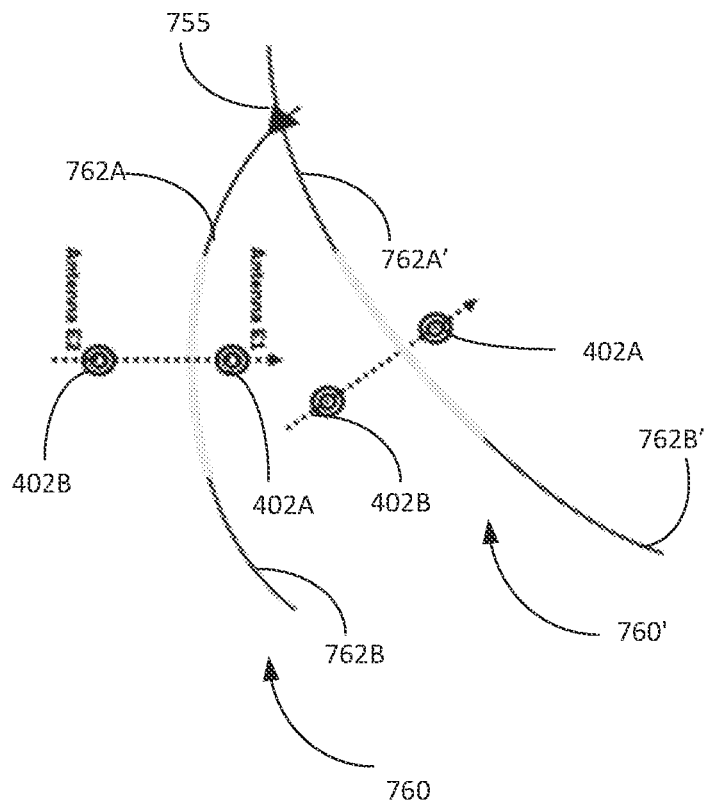
FIG. 7 depicts an exemplary diagram of determining the source azimuth of a GNSS interference source based on aircraft heading changes.

FIG. 7 depicts an exemplary diagram depicting a technique for determining the source location of a GNSS interference source when the measurements of carrier phases and aircraft positions are determined. Antenna elements 402A, 402B are originally in a first position 760 on the aircraft, with two azimuth ambiguities 762A, 762B that correspond to the source azimuth of a GNSS interference source. As the aircraft experiences a heading change to a second position 760', first azimuth ambiguity 762A and second azimuth ambiguity 762B change in position to first azimuth ambiguity 762A' and second azimuth ambiguity 762B", respectively. The source azimuth as well as the source location can be determined between the two azimuth ambiguities based on the correlation between the azimuth ambiguities before and after the heading change. As shown in FIG. 7, first azimuth ambiguity 762A intersects first azimuth ambiguity 762A' at point 755, while second azimuth ambiguity 762B does not intersect with second azimuth ambiguity 762B' after the aircraft changes heading to position 760'. Accordingly, second azimuth ambiguity 762B, 762B' can be excluded as the source azimuth and first azimuth ambiguity 762A, 762A' corresponds to the source azimuth 755 of the GNSS interference source, and their intersection is determined to be the source location.

Figure 8:
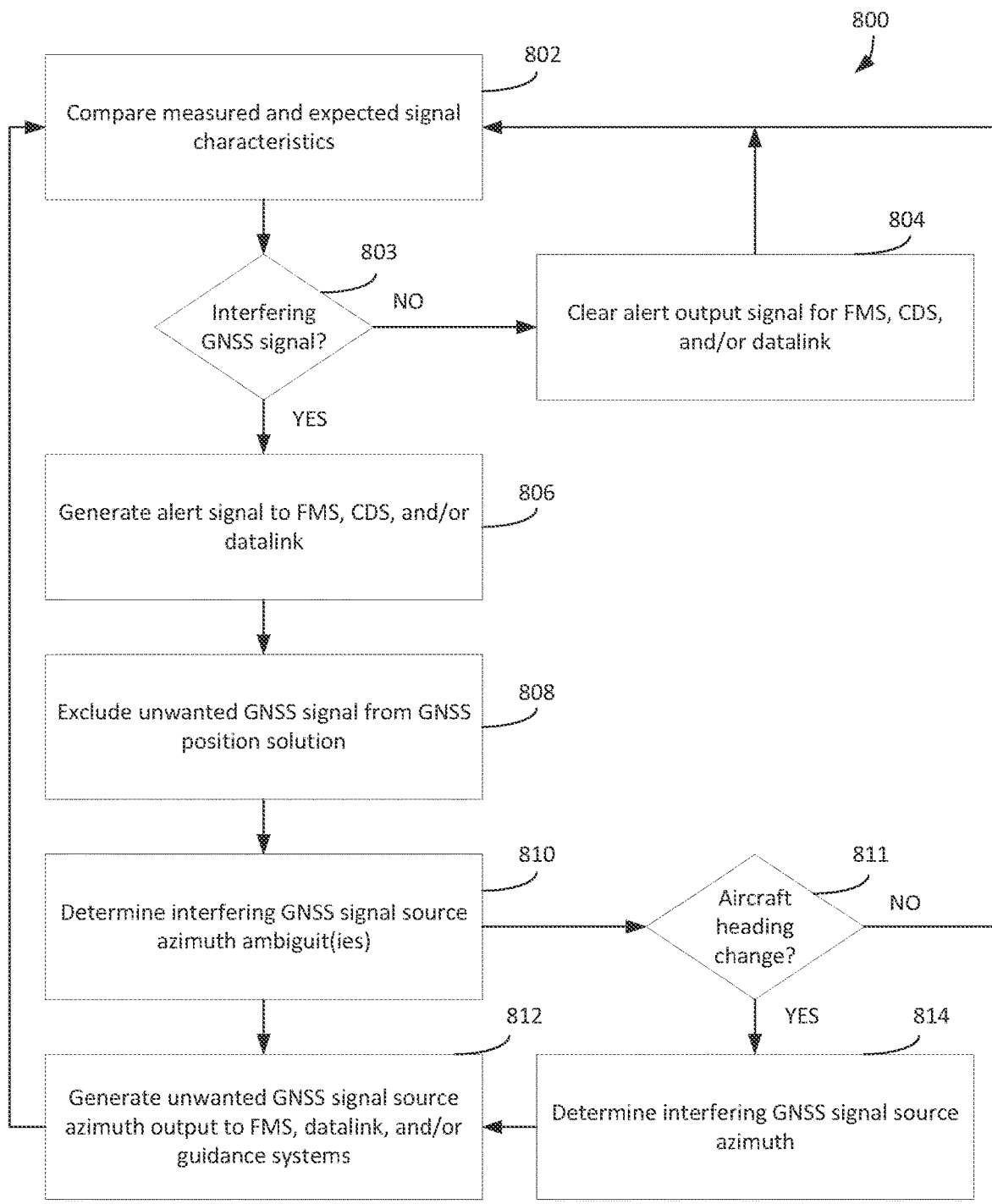
FIG. 8 depicts a flow diagram depicting an exemplary method for determining a source azimuth of a GNSS interference source.

FIG. 8 depicts a flow diagram depicting an exemplary method 800 for determining a source azimuth of a GNSS interference source. Method 800 may be implemented via the techniques described with respect to FIGS. 1-7, but may be implemented via other techniques as well. The blocks of the flow diagram have been arranged in a generally sequential manner for ease of explanation: however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 800 includes comparing the measured and expected signal characteristics of GNSS signals at block 802. For example, a GNSS detection system implemented on a navigation system onboard the vehicle can be used to detect a spoofed or jammed signal, such as the systems described in FIGS. 2-3. At block 803, method 800 determines whether the received GNSS signals are the result of GNSS interference, such as by spoofing or jamming. In one embodiment, method 800 determines that the difference between the expected and measured signal characteristics exceed a threshold value indicative of GNSS interference. If no interfering GNSS signal is detected, method 800 may proceed to block 804 and clear an alert signal for any GNSS interference that was previously detected at an earlier time, for a flight management system (FMS), (CDS), and/or datalink communication system. The method 800 can then revert back to block 802 and compare measured and expected signal characteristics for a new set of GNSS signals.

If an interfering GNSS signal was detected, then method 800 proceeds from block 803 to block 806 and generates an alert signal to one or more systems, e.g., a flight management system, cockpit display system, and/or datalink communication system. In one embodiment, the cockpit display system is configured to display an alert to the flight crew. Method 800 then proceeds to block 808 and excludes the interfering GNSS signal from the GNSS position solution determined from the GNSS signals received by one or more GNSS receivers onboard the vehicle. At block 810, method 800 determines one or more interfering GNSS signal source azimuth ambiguities for each GNSS interference source, e.g., based on the methods described in FIGS. 4-7. Method 800 then proceeds to block 812 and generates an output of the azimuth ambiguity determination(s) to the flight management system, datalink communication system, and/or a guidance system. For example, when the azimuth ambiguities are provided to the flight management system, the flight management system directs the cockpit display system to display the source azimuth ambiguities to the flight crew. The flight management system is also configured to determine a modified flight path based on the azimuth ambiguities and flight constraints. The modified flight path can be implemented automatically or can be manually implemented by the flight crew: In another example, the evacuation guidance can be a simple indication of the interfering GNSS signal source azimuth (e.g., as manifested on a conventional steam gauge style instrument display), and the flight crew can execute an evasive maneuver by flying opposite to the direction of the interfering GNSS signal source azimuth.

From block 810, method 800 also proceeds to block 811 and determines whether the aircraft has experienced a heading change, e.g., from inertial or air data sensors onboard the vehicle. If the aircraft has experienced a heading change, then method 800 proceeds to block 814 and determines the source azimuth of the GNSS interference source(s) based on the heading change of the aircraft and the azimuth ambiguities. Method 800 then proceeds to block 812 and generates an output of the source azimuths to the flight management system, datalink communication system, and/or guidance system. For example, if initially the azimuth ambiguities were provided to these systems and the aircraft later experiences a heading change, the modified flight path can be updated with the source azimuth determined at block 814. If the aircraft has not yet experienced a heading change at block 811, then method 800 can revert to block 802 and determine whether the interfering GNSS signals are still present. Thus, method 800 can be repeated so that when the aircraft does experience a heading change, a source azimuth can be determined from any azimuth ambiguities and update the existing flight path of the aircraft.

Figure 9:
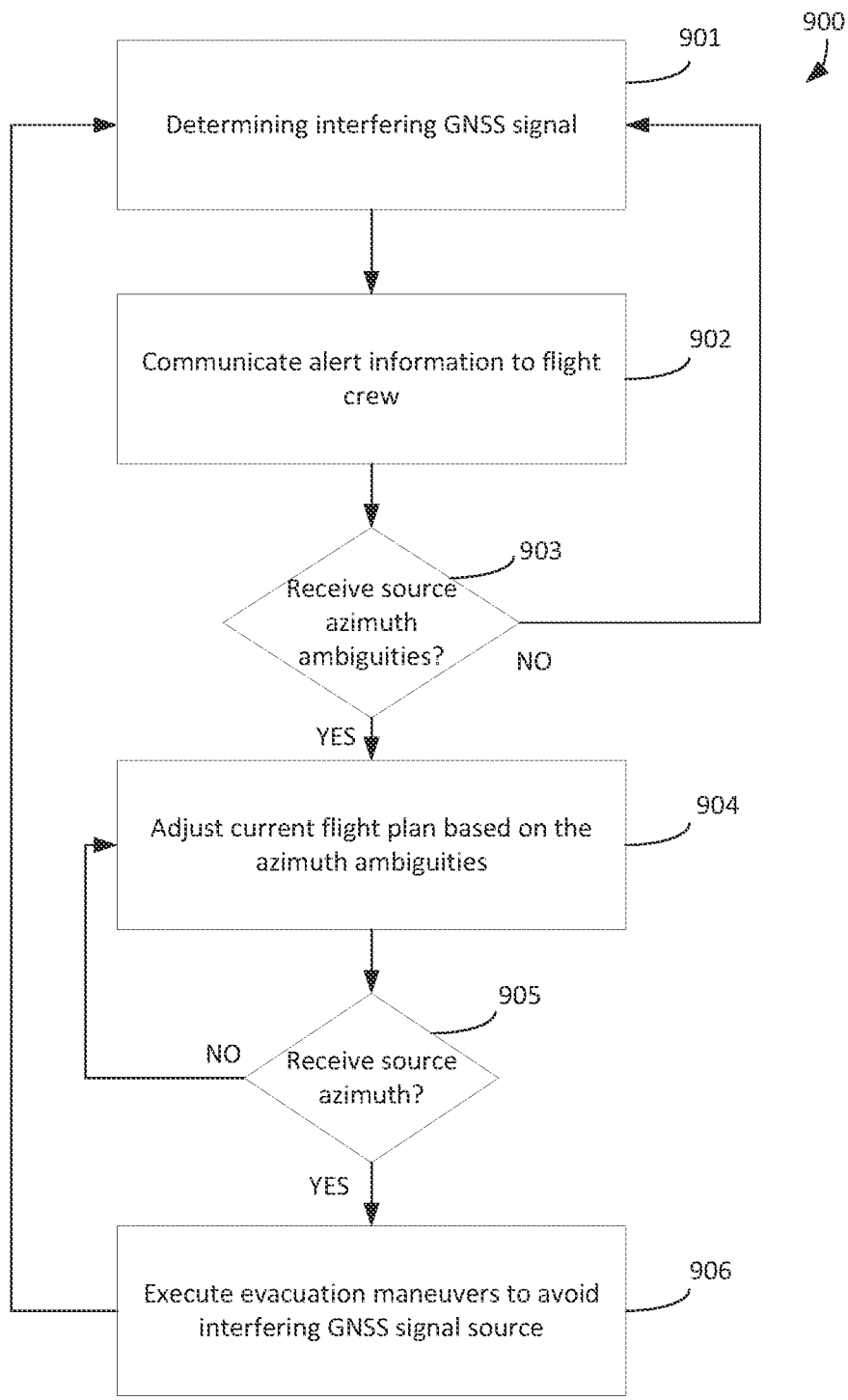
FIG. 9 depicts a flow diagram of an exemplary method for implementing evacuation guidance parameters based on a source azimuth of at least one GNSS interference source in a geographical region.

FIG. 9 depicts a flow diagram of an exemplary method 900 for implementing evacuation guidance parameters based on a source azimuth of one or more GNSS interference sources in a geographical location. In one embodiment, method 900 can be executed in conjunction with method 800 and the techniques described in the context of FIGS. 1-7. In another embodiment, method 900 is implemented when an aircraft does not have the capabilities to determine the source azimuth of the GNSS interference sources present in the geographical location currently traversed by the aircraft.

Method 900 includes determining an interfering GNSS signal at block 901 from at least one GNSS interference source in a geographical region in which the aircraft is currently traversing through. Method 900 then proceeds to block 902 and communicates an alert to the flight crew informing the crew of the existing interfering GNSS signals. At this stage, the aircraft attempts to get the source azimuth of the GNSS interference sources that are causing the aircraft to receive interfering GNSS signals. Proceeding to block 903, method 900 determines whether the azimuth ambiguities corresponding to each GNSS interference source (whose source azimuth is still unknown) are received. For example, if the aircraft is capable of determining the azimuth ambiguities, then such ambiguities are determined as described in FIG. 8. However, if the aircraft is not able to determine the azimuth ambiguities on its own accord, the aircraft can send a request to a central processing system remotely coupled to the aircraft, e.g., central processing system 104 for the azimuth ambiguities of the GNSS interference sources. For example, in some embodiments central processing system 104 is configured to determine the azimuth ambiguities as described in FIGS. 3-7 based on the signal characteristics of the interfering GNSS signals provided by the aircraft in the request. However, the central processing system 104 may determine the azimuth ambiguities in other ways, such as from stored data received from other vehicles communicatively coupled to the central processing system 104 relevant to the geographical region in which the requesting vehicle is currently traversing through. The requesting aircraft then receives the determined azimuth ambiguities from the central processing system 104 at block 903. If the azimuth ambiguities have not been received at block 903, then method 900 may revert back to block 901 and determine whether the interfering GNSS signals are still present.

Method 900 proceeds to block 904 and adjusts the current flight path based on the received azimuth ambiguities for the GNSS interference source(s) in the geographical region to analyze the ambiguity of the azimuth (see block 814 of FIG. 8). In the meantime, the original flight path can be adjusted in the geographical location to avoid the locations that correspond to each azimuth ambiguity. Additionally, the azimuth ambiguities may indicate that the GNSS interference source is moving relative to the aircraft, in which case the flight path can be modified to account for the movement of the GNSS interference source (e.g., by traversing in a direction opposite or non-overlapping with respect to the anticipated movement of the GNSS interference source).

At block 905, method 900 determine whether the source azimuth of the at least one GNSS interference source is received, e.g., from systems on the vehicle or if the vehicle is not capable of determining the source azimuth, then from central processing system 104. If the source azimuth has not yet been received at block 905, then method 900 may revert to block 904 and continue to implement or update the flight path in the geographical location as it waits for the source azimuth. If the source azimuths are received at block 905, then method 900 proceeds to block 906 and executes evasive maneuvers to avoid the interfering GNSS signal source based on the source azimuth. In an embodiment, the source azimuths may be used to exclude one or more azimuth ambiguities that were associated with the GNSS interference source and/or used to determine the position and/or movement of the GNSS interference source. If the vehicle modified its flight path based on the determined azimuth ambiguities and the modified flight path does not optimize the movement of the vehicle in the geographical region while still accounting for the source azimuth or movement of the GNSS interference source, then the flight path may be further updated based on new excluded azimuth ambiguities to optimize the path through the geographical region that minimizes the impact of the GNSS interference source. Once the vehicle is outside of the geographical region, the vehicle can further modify the flight path to revert to its original path except that it continues to avoid the geographical region defined by the interference range of the GNSS interference source(s). The flight path can continue to be modified as the movement of the GNSS interference source(s) changes and hence, the associated geographical regions of interference, changes.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forma of non-volatile memory, including by way of example semiconductor memory devices, such as erasable programmable read-only memory (EPROM), electrically-erasable programmable read-only memory (EEPROM), and flash memory devices: magnetic disks such as internal hard disks and removable disks: magneto-optical disks: and digital video disks (DVDs). Any of the foregoing may be supplemented by, or incorporated in, specially-designed application specific integrated-circuits (ASICs).

EXAMPLE EMBODIMENTS

Example 1 includes a method, comprising: receiving at least one characteristic of at least one source radiating signals in at least one geographical region in which a vehicle is traversing, wherein the at least one characteristic is received in response to a determination that the radiating signals from the at least one source interfere with operation of at least one global navigation satellite systems (GNSS) receiver associated with the vehicle; and sending, in response to the received at least one characteristic of the at least one source, a message to one or more systems on the vehicle, the message including evacuation guidance parameters that provide a representation of interference mitigation due to the interference of the at least one GNSS receiver from the at least one source during a period of time in which the vehicle is inside the at least one geographical region.

Example 2 includes the method of Example 1, wherein the at least one characteristic includes an azimuth parameter corresponding to the at least one source, a type of interference to the at least one GNSS receiver, a pseudorandom noise (PRN) number, and a time of interference to the at least one GNSS receiver.

Example 3 includes the method of any of Examples 1-2, further comprising: acquiring at least one navigation parameter of the vehicle, wherein the at least one navigation parameter includes a change of a heading of the vehicle: determining, based on the change of the heading of the vehicle, an azimuth parameter of the at least one source: and determining, based on the azimuth parameter of the at least one source, a location and/or movement of the at least one source, wherein the evacuation guidance parameters include the azimuth parameter, the location, and/or the movement of the at least one source in the at least one geographical region.

Example 4 includes the method of any of Examples 1-3, further comprising: receiving at least one azimuth ambiguity that corresponds to the at least one source: determining at least one updated azimuth ambiguity corresponding to the at least one source based on a heading change of the vehicle: and generating a first modified travel path based on the received at least one azimuth ambiguity that avoids a position associated with the at least one updated azimuth ambiguity while the vehicle is traversing in the at least one geographical region.

Example 5 includes the method of any of Examples 1-4, further comprising: receiving at least one source azimuth based on at least one azimuth ambiguity, the at least one source azimuth corresponding to the at least one source: and generating a second modified travel path based on the at least one source azimuth that avoids a position associated with the at least one source azimuth while the vehicle is traversing in the at least one geographical region.

Example 6 includes the method of any of Examples 1-5, further comprising: determining a movement of the at least one source based on at least one azimuth parameter of the at least one source, wherein the at least one azimuth parameter includes an azimuth ambiguity or a source azimuth of the at least one source: and generating a third modified travel path based on the movement of the at least one source that avoids a change in position associated with the movement of the at least one source while the vehicle is traversing in the at least one geographical region.

Example 7 includes the method of any of Examples 1-6, further comprising: determining a set of azimuth ambiguities including at least one first azimuth ambiguity and at least one second azimuth ambiguity corresponding to the at least one source: determining a first set of carrier phase difference shifts including at least one first carrier phase difference shift corresponding to the at least one first azimuth ambiguity and at least one second carrier phase difference shift corresponding to the at least one second azimuth ambiguity based on a heading change of the vehicle: measuring a second carrier phase difference shift in response to a heading change of the vehicle: and determining an updated source azimuth ambiguity of the at least one source based on a correlation between the first set of carrier phase difference shifts and the measured second carrier phase difference shift.

Example 8 includes the method of any of Examples 1-7, comprising: determining a set of azimuth ambiguities including at least one first azimuth ambiguity and at least one second azimuth ambiguity corresponding to the at least one source: determining that the first azimuth ambiguity changes relative to an absolute reference axis corresponding to a heading change of the vehicle: excluding the first azimuth ambiguity: and determining the source azimuth based on the second azimuth ambiguity.

Example 9 includes the method of any of Examples 1-8, further comprising determining a source location of the at least one source, wherein determining the source location of the at least one source comprises: determining that a first azimuth ambiguity intersects with a shifted azimuth ambiguity associated with a heading change of the vehicle: and determining the source location of the at least one source based on the intersection between the first azimuth ambiguity and the first shifted azimuth ambiguity.

Example 10 includes a program product comprising a non-transitory processor-readable medium on which program instructions, configured to be executed by at least one processor, are embodied, wherein when executed by the at least one processor, the program instructions cause the at least one processor to: receive at least one characteristic of at least one source radiating signals in at least one geographical region in which a vehicle is traversing in, wherein the at least one characteristic is received in response to a determination that the radiating signals from the at least one source interfere with operation of at least one global navigation satellite systems (GNSS) receiver associated with the vehicle: and send, in response to the received at least one characteristic of the at least one source, a message to one or more systems on the vehicle, the message including evacuation guidance parameters that provide a representation of interference mitigation due to the interference of the at least one GNSS receiver from the at least one source during a period of time in which the vehicle is inside the at least one geographical region.

Example 11 includes the program product of Example 10, wherein the at least one characteristic includes an azimuth parameter corresponding to the at least one source, a type of interference to the at least one GNSS receiver, a pseudo-random noise (PRN) number, and a time of interference to the at least one GNSS receiver.

Example 12 includes the program product of any of Examples 10-11, wherein the program instructions cause the at least one processor to: acquire at least one navigation parameter of the vehicle, wherein the at least one navigation parameter includes a change of a heading of the vehicle: determine, based on the change of the heading of the vehicle, an azimuth parameter of the at least one source: and determine, based on the azimuth parameter of the at least one source, a location and/or movement of the at least one source, wherein the message includes the azimuth parameter, the location, and/or the movement of the at least one source in the at least one geographical region.

Example 13 includes the program product of any of Examples 10-12, wherein the evacuation guidance parameters include at least one azimuth ambiguity corresponding to the at least one source, a source azimuth corresponding to the at least one source, a location and/or movement associated with the at least one source, wherein the program instructions further cause the at least one processor to generate a modified travel path based on at least one of: the at least one azimuth ambiguity, the source azimuth, the location, or the movement associated with the at least one source.

Example 14 includes the program product of any of Examples 10-13, wherein the at least one geographical region is defined by an interference range of the at least one source.

Example 15 includes the program product of any of Examples 10-14, wherein to send a message to one or more systems on the vehicle comprises to send the message from a central processing system located remotely from the vehicle to a communications system onboard the vehicle.

Example 16 includes a system, comprising: at least one global navigation satellite system (GNSS) receiver mounted on a vehicle and configured to receive GNSS signals: and a vehicle processing system coupled to the vehicle and comprising at least one processor coupled to the at least one GNSS receiver, wherein the vehicle processing system is configured to determine interfering GNSS signals from the GNSS signals: wherein the at least one processor is configured to: determine, from the interfering GNSS signals, at least one characteristic of at least one source radiating signals in at least one geographical region in which the vehicle is traversing and acquire, in response to the determined at least one characteristic of the at least one source, evacuation guidance parameters that provide a representation of interference mitigation due to the interference of the at least one GNSS receiver from the at least one source during a period of time in which the vehicle is inside the at least one geographical region.

Example 17 includes the system of Example 16, further comprising a communications system coupled to the vehicle processing system, wherein the communications system is configured to: receive the at least one characteristic of the at least one source: send a request message to a central processing system located remotely from the vehicle including the at least one characteristic: receive a response message from the central processing system including the evacuation guidance parameters, wherein the evacuation guidance parameters include at least one of: at least one azimuth ambiguity corresponding to the at least one source, a source azimuth of the at least one source, a source location, and/or movement of the at least one source in the at least one geographical region: and provide the evacuation guidance parameters to the vehicle processing system: wherein the vehicle processing system comprises a guidance system configured to execute evasive maneuvers based on the evacuation guidance parameters.

Example 18 includes the system of any of Examples 16-17, wherein the vehicle processing system comprises a guidance system configured to determine the evacuation guidance parameters from the at least one characteristic, wherein to determine the evacuation guidance parameters comprises: acquire at least one navigation parameter of the vehicle, wherein the at least one navigation parameter includes a change of a heading of the vehicle: determine, based on the change of the heading of the vehicle, an azimuth parameter of the at least one source: and determine, based on the azimuth parameter of the at least one source, a location and/or movement of the at least one source: wherein the guidance system is configured to execute evasive maneuvers based on the azimuth parameter, the location, and/or the movement of the at least one source in the at least one geographical region.

Example 19 includes the system of any of Examples 16-18, wherein the vehicle processing system comprises a flight management system and a flight control system coupled to the flight management system, wherein the flight management system is configured to generate a modified travel path based on the evacuation guidance parameters, wherein the evacuation guidance parameters include at least one of: at least one azimuth ambiguity corresponding to the at least one source, a source azimuth of the at least one source, and/or a movement of the at least one source in the at least one geographical region: wherein the flight management system is configured to, at least one of: receive at least one azimuth ambiguity that corresponds to the at least one source: and generate a first modified travel path based on the received at least one azimuth ambiguity that avoids a position associated with the at least one azimuth ambiguity while the vehicle is traversing in the at least one geographical region: receive at least one source azimuth corresponding to the at least one source: and generate a second modified travel path based on the at least one source azimuth that avoids a position associated with the at least one source azimuth while the vehicle is traversing in the at least one geographical region: and/or receive a movement of the at least one source based on at least one azimuth parameter of the at least one source, wherein the at least one azimuth parameter includes an azimuth ambiguity or a source azimuth of the at least one source: and generate a third modified travel path based on the movement of the at least one source that avoids a change in position associated with the movement of the at least one source while the vehicle is traversing in the at least one geographical region, wherein the flight control system is configured to execute at least one of the first modified travel path, second modified travel path, or third modified travel path, wherein the flight control system is configured to generate a heading change based on the first modified travel path, second modified travel path, or third modified travel path, wherein the flight management system is configured to determine at least one updated azimuth ambiguity of the at least one source from the generated heading change.

Example 20 includes the system of any of Examples 16-19, wherein the vehicle processing system comprises a guidance system, and further comprising at least one onboard system coupled to the guidance system, wherein the guidance system is configured to adjust operational modes of the at least one onboard system based on the at least one characteristic of the at least one source.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method, comprising:
   receiving at least one characteristic of at least one source radiating signals in at least one geographical region in which a vehicle is traversing, wherein the at least one characteristic includes an azimuth parameter of the at least one source and is received in response to a determination that the radiating signals from the at least one source interfere with operation of at least one global navigation satellite systems (GNSS) receiver associated with the vehicle, and wherein the azimuth parameter is identified based on a change of a heading of the vehicle; and
   sending, in response to the received at least one characteristic of the at least one source, a message to one or more systems on the vehicle, the message including evacuation guidance parameters for evacuating the at least one geographical region due to the interference of the at least one GNSS receiver from the at least one source during a period of time in which the vehicle is inside the at least one geographical region.

2. The method of claim 1, wherein the at least one characteristic includes the azimuth parameter corresponding to the at least one source, a type of interference to the at least one GNSS receiver, a pseudorandom noise (PRN) number, and a time of interference to the at least one GNSS receiver.

3. The method of claim 1, further comprising:
   acquiring at least one navigation parameter of the vehicle, wherein the at least one navigation parameter includes the change of the heading of the vehicle;
   determining, based on the change of the heading of the vehicle, the azimuth parameter of the at least one source; and
   determining, based on the azimuth parameter of the at least one source, a location and/or movement of the at least one source,
   wherein the evacuation guidance parameters include the azimuth parameter, the location, and/or the movement of the at least one source in the at least one geographical region.

4. The method of claim 1, further comprising:
   receiving at least one azimuth ambiguity that corresponds to the at least one source;
   determining at least one updated azimuth ambiguity corresponding to the at least one source based on the change of the heading of the vehicle; and
   generating a first modified travel path based on the received at least one azimuth ambiguity that avoids a position associated with the at least one updated azimuth ambiguity while the vehicle is traversing in the at least one geographical region.

5. The method of claim 1, further comprising:
   receiving at least one source azimuth based on at least one azimuth ambiguity, the at least one source azimuth corresponding to the at least one source; and
   generating a second modified travel path based on the at least one source azimuth that avoids a position associated with the at least one source azimuth while the vehicle is traversing in the at least one geographical region.

6. The method of claim 1, further comprising:
   determining a movement of the at least one source based on at least one azimuth parameter of the at least one source, wherein the at least one azimuth parameter includes an azimuth ambiguity or a source azimuth of the at least one source; and
   generating a third modified travel path based on the movement of the at least one source that avoids a change in position associated with the movement of the at least one source while the vehicle is traversing in the at least one geographical region.

7. The method of claim 1, further comprising:
   determining a set of azimuth ambiguities including at least one first azimuth ambiguity and at least one second azimuth ambiguity corresponding to the at least one source;
   determining a first set of carrier phase difference shifts including at least one first carrier phase difference shift corresponding to the at least one first azimuth ambiguity and at least one second carrier phase difference shift corresponding to the at least one second azimuth ambiguity based on the change of the heading of the vehicle;
   measuring a second carrier phase difference shift in response to the change of the heading of the vehicle; and determining an updated source azimuth ambiguity of the at least one source based on a correlation between the first set of carrier phase difference shifts and the measured second carrier phase difference shift.

8. The method of claim 1, comprising:
determining a set of azimuth ambiguities including at least one first azimuth ambiguity and at least one second azimuth ambiguity corresponding to the at least one source;
determining that the first azimuth ambiguity changes relative to an absolute reference axis corresponding to the change of the heading of the vehicle;
excluding the first azimuth ambiguity; and
determining the source azimuth based on the second azimuth ambiguity.

9. The method of claim 1, further comprising determining a source location of the at least one source, wherein determining the source location of the at least one source comprises:
determining that a first azimuth ambiguity intersects with a shifted azimuth ambiguity associated with the change of the heading of the vehicle; and
determining the source location of the at least one source based on the intersection between the first azimuth ambiguity and the first shifted azimuth ambiguity.

10. A program product comprising a non-transitory processor-readable medium on which program instructions, configured to be executed by at least one processor, are embodied, wherein when executed by the at least one processor, the program instructions cause the at least one processor to:
receive at least one characteristic of at least one source radiating signals in at least one geographical region in which a vehicle is traversing in, wherein the at least one characteristic includes an azimuth parameter of the at least one source and is received in response to a determination that the radiating signals from the at least one source interfere with operation of at least one global navigation satellite systems (GNSS) receiver associated with the vehicle, and wherein the azimuth parameter is identified based on a change of a heading of the vehicle; and
send, in response to the received at least one characteristic of the at least one source, a message to one or more systems on the vehicle, the message including evacuation guidance parameters for evacuating the at least one geographical region due to the interference of the at least one GNSS receiver from the at least one source during a period of time in which the vehicle is inside the at least one geographical region.

11. The program product of claim 10, wherein the at least one characteristic includes the azimuth parameter corresponding to the at least one source, a type of interference to the at least one GNSS receiver, a pseudorandom noise (PRN) number, and a time of interference to the at least one GNSS receiver.

12. The program product of claim 10, wherein the program instructions cause the at least one processor to:
acquire at least one navigation parameter of the vehicle, wherein the at least one navigation parameter includes the change of the heading of the vehicle;
determine, based on the change of the heading of the vehicle, an azimuth parameter of the at least one source; and
determine, based on the azimuth parameter of the at least one source, a location and/or movement of the at least one source,
wherein the message includes the azimuth parameter, the location, and/or the movement of the at least one source in the at least one geographical region.

13. The program product of claim 10, wherein the evacuation guidance parameters include at least one azimuth ambiguity corresponding to the at least one source, the azimuth parameter corresponding to the at least one source, a location and/or movement associated with the at least one source, wherein the program instructions further cause the at least one processor to generate a modified travel path based on at least one of: the at least one azimuth ambiguity, the azimuth parameter of the at least one source, the location, or the movement associated with the at least one source.

14. The program product of claim 10, wherein the at least one geographical region is defined by an interference range of the at least one source.

15. The program product of claim 10, wherein to send a message to one or more systems on the vehicle comprises to send the message from a central processing system located remotely from the vehicle to a communications system onboard the vehicle.

16. A system, comprising:
at least one global navigation satellite system (GNSS) receiver mounted on a vehicle and configured to receive GNSS signals; and
a vehicle processing system coupled to the vehicle and comprising at least one processor coupled to the at least one GNSS receiver, wherein the vehicle processing system is configured to determine interfering GNSS signals from the GNSS signals;
wherein the at least one processor is configured to:
determine, from the interfering GNSS signals, at least one characteristic of at least one source radiating signals in at least one geographical region in which the vehicle is traversing wherein the at least one characteristic includes an azimuth parameter of the at least one source and wherein the azimuth parameter is identified based on a change of a heading of the vehicle; and
acquire, in response to the determined at least one characteristic of the at least one source, evacuation guidance parameters for evacuating the at least one geographical region due to the interference of the at least one GNSS receiver from the at least one source during a period of time in which the vehicle is inside the at least one geographical region.

17. The system of claim 16, further comprising a communications system coupled to the vehicle processing system, wherein the communications system is configured to:
receive the at least one characteristic of the at least one source;
send a request message to a central processing system located remotely from the vehicle including the at least one characteristic;
receive a response message from the central processing system including the evacuation guidance parameters, wherein the evacuation guidance parameters include at least one of: at least one azimuth ambiguity corresponding to the at least one source, the azimuth parameter of the at least one source, a source location, and/or movement of the at least one source in the at least one geographical region; and
provide the evacuation guidance parameters to the vehicle processing system;
wherein the vehicle processing system comprises a guidance system configured to execute evasive maneuvers based on the evacuation guidance parameters.

18. The system of claim 16, wherein the vehicle processing system comprises a guidance system configured to determine the evacuation guidance parameters from the at least one characteristic, wherein to determine the evacuation guidance parameters comprises:
  acquire at least one navigation parameter of the vehicle, wherein the at least one navigation parameter includes the change of the heading of the vehicle;
  determine, based on the change of the heading of the vehicle, the azimuth parameter of the at least one source; and
  determine, based on the azimuth parameter of the at least one source, a location and/or movement of the at least one source;
  wherein the guidance system is configured to execute evasive maneuvers based on the azimuth parameter, the location, and/or the movement of the at least one source in the at least one geographical region.

19. The system of claim 16, wherein the vehicle processing system comprises a flight management system and a flight control system coupled to the flight management system, wherein the flight management system is configured to generate a modified travel path based on the evacuation guidance parameters, wherein the evacuation guidance parameters include at least one of: at least one azimuth ambiguity corresponding to the at least one source, the azimuth parameter of the at least one source, and/or a movement of the at least one source in the at least one geographical region;
  wherein the flight management system is configured to, at least one of:
    receive at least one azimuth ambiguity that corresponds to the at least one source; and generate a first modified travel path based on the received at least one azimuth ambiguity that avoids a position associated with the at least one azimuth ambiguity while the vehicle is traversing in the at least one geographical region;
    receive the azimuth parameter of to the at least one source; and generate a second modified travel path based on the azimuth parameter that avoids a position associated with the azimuth parameter of the at least one source while the vehicle is traversing in the at least one geographical region; and/or
    receive a movement of the at least one source based on the at least one azimuth parameter of the at least one source, wherein the at least one azimuth parameter includes an azimuth ambiguity or the azimuth of the at least one source; and generate a third modified travel path based on the movement of the at least one source that avoids a change in position associated with the movement of the at least one source while the vehicle is traversing in the at least one geographical region,
  wherein the flight control system is configured to execute at least one of the first modified travel path, second modified travel path, or third modified travel path, wherein the flight control system is configured to generate a heading change based on the first modified travel path, second modified travel path, or third modified travel path, wherein the flight management system is configured to determine at least one updated azimuth ambiguity of the at least one source from the generated heading change.

20. The system of claim 16, wherein the vehicle processing system comprises a guidance system, and further comprising at least one onboard system coupled to the guidance system, wherein the guidance system is configured to adjust operational modes of the at least one onboard system based on the at least one characteristic of the at least one source.

* * * * *